(12) United States Patent
Cheng et al.

(10) Patent No.: US 9,511,789 B2
(45) Date of Patent: Dec. 6, 2016

(54) STROLLER

(71) Applicants: Chin-Ming Cheng, N.T. (HK); Shun-Min Chen, N.T. (HK); Yun-Ju Chen, N.T. (HK); I-Ting Yeh, N.T. (HK)

(72) Inventors: Chin-Ming Cheng, N.T. (HK); Shun-Min Chen, N.T. (HK); Yun-Ju Chen, N.T. (HK); I-Ting Yeh, N.T. (HK)

(73) Assignee: Wonderland Nurserygoods Company Limited, NT (HK)

( * ) Notice: Subject to any disclaimer, the term of this patent is extended or adjusted under 35 U.S.C. 154(b) by 46 days.

(21) Appl. No.: 14/322,908

(22) Filed: Jul. 2, 2014

(65) Prior Publication Data

US 2014/0312586 A1 Oct. 23, 2014

Related U.S. Application Data

(62) Division of application No. 13/859,740, filed on Apr. 10, 2013, now Pat. No. 8,857,829.

(Continued)

(51) Int. Cl.
*B62B 1/00* (2006.01)
*B62B 7/00* (2006.01)
(Continued)

(52) U.S. Cl.
CPC ............... *B62B 7/008* (2013.01); *B62B 9/26* (2013.01); *B62B 9/28* (2013.01); *B62B 5/087* (2013.01);
(Continued)

(58) Field of Classification Search
CPC .............. B62B 7/08; B62B 11/00; B62B 7/06; B62B 1/00
(Continued)

(56) References Cited

U.S. PATENT DOCUMENTS 5,184,835 A * 2/1993 Huang ..................... 280/47.371
5,417,449 A 5/1995 Shamie
(Continued)

FOREIGN PATENT DOCUMENTS

CN 101712332 A 5/2010
CN 201729180 U 2/2011
(Continued)

*Primary Examiner* — Hau Phan
(74) *Attorney, Agent, or Firm* — Winston Hsu; Scott Margo

(57) ABSTRACT

A stroller includes a stroller frame, a front seat assembly, a rear seat assembly, and an accommodating basket. The stroller frame includes two side support assembly disposed oppositely. The front seat assembly and the rear seat assembly are disposed between the two side support assemblies. The accommodating basket is disposed between the two side support assemblies and located under the front seat assembly and includes a main portion and an expansible side portion connected to the main portion. The main portion forms an accommodating space. The rear seat structure is moveable relative to the stroller frame. When the rear seat assembly is moved relative to the stroller frame, the expansible side portion is capable of spreading upward to be fixed on the two side support assemblies so as to extend the accommodating space upward into the rear seat space.

9 Claims, 17 Drawing Sheets

Related U.S. Application Data

(60) Provisional application No. 61/622,008, filed on Apr. 10, 2012, provisional application No. 61/673,259, filed on Jul. 19, 2012.

(51) Int. Cl.
  *B62B 9/26* (2006.01)
  *B62B 9/28* (2006.01)
  *B62B 7/14* (2006.01)
  *B62B 5/08* (2006.01)

(52) U.S. Cl.
  CPC ................ *B62B 7/142* (2013.01); *B62B 7/145* (2013.01); *B62B 2206/06* (2013.01)

(58) Field of Classification Search
  USPC ............. 280/47.371, 47.38, 47.37, 642, 647, 643, 280/650, 652
  See application file for complete search history.

(56) References Cited

U.S. PATENT DOCUMENTS

| | | |
|---|---|---|
| 5,664,795 A | 9/1997 | Haung |
| 6,086,087 A | 7/2000 | Yang |
| D430,076 S | 8/2000 | Gehr |
| D431,212 S * | 9/2000 | Haung .......................... D12/129 |
| 6,267,406 B1 | 7/2001 | Huang |
| 6,523,840 B1 | 2/2003 | Koppes |
| 6,585,284 B2 * | 7/2003 | Sweeney et al. ............. 280/650 |
| 6,676,140 B1 | 1/2004 | Gondobintoro |
| 6,843,498 B2 | 1/2005 | Bretschger |
| 6,979,017 B2 | 12/2005 | Chen |
| 7,004,272 B1 | 2/2006 | Brown |
| 7,290,786 B2 * | 11/2007 | Cheng et al. ................. 280/647 |
| 7,588,263 B2 * | 9/2009 | Yang ............................. 280/642 |
| 8,186,705 B2 * | 5/2012 | Greger et al. ................ 280/643 |
| 8,328,208 B2 * | 12/2012 | Chen .......................... 280/47.38 |
| 8,371,606 B2 * | 2/2013 | Gower et al. ................ 280/642 |
| 8,480,115 B2 | 7/2013 | Chen |
| 8,602,441 B2 | 12/2013 | Li |
| 8,857,829 B2 * | 10/2014 | Cheng et al. .............. 280/47.38 |
| 2002/0036391 A1 | 3/2002 | Sweeney |
| 2003/0020259 A1 * | 1/2003 | Tai et al. ....................... 280/647 |
| 2009/0315300 A1 | 12/2009 | Stiba |
| 2010/0140902 A1 * | 6/2010 | Zehfuss ........................ 280/650 |
| 2010/0244393 A1 * | 9/2010 | Thomas et al. ............... 280/650 |

FOREIGN PATENT DOCUMENTS

| | | |
|---|---|---|
| EP | 0 864 480 A1 | 9/1998 |
| EP | 1 462 335 A2 | 9/2004 |
| EP | 2 444 296 A2 | 4/2012 |
| FR | 2 798 349 | 3/2001 |
| WO | 2009039537 A2 | 3/2009 |
| WO | 2009039537 A3 | 3/2009 |
| WO | 2011087506 A1 | 7/2011 |
| WO | 2012019311 A1 | 2/2012 |

* cited by examiner

STROLLER

CROSS REFERENCE TO RELATED APPLICATIONS

This application is a divisional application of U.S. patent application Ser. No. 13/859,740, which is filed on Apr. 10, 2013 and claims the benefit of U.S. Provisional Applications No. 61/622,008 and 61/673,259, which were filed on Apr. 10, 2012 and Jul. 19, 2012 respectively, and are incorporated herein by reference.

BACKGROUND OF THE INVENTION

1. Field of the Invention

The invention relates to a stroller, and especially relates to a stroller with a storage basket.

2. Description of the Prior Art

For carrying two children at a time, double strollers are available on the market. Manufacturers continue developing strollers. Current double strollers are various. One kind of the double strollers uses a side-by-side design. Its advantage is that the lines of vision of two children sitting thereon are equivalent. No shading due to sitting in the front and rear in different heights occurs. Besides, the children sitting thereon can interact with each other. However, such strollers are wider and require wider lanes. When the double stroller runs on a narrow lane, the caregiver is required to be very careful. Another kind of the double strollers uses a back-to-back design. It is suitable to two children with a certain age difference. Therein, the older child sits on the rear seat without safety belt; the younger child sits on the front seat with an auxiliary safety belt. The advantage of such double strollers is saving space. However, the disadvantage thereof is that the two children sit in different orientations and seldom interact with each other because of different views. Moreover, such double strollers are unfavorable for the children to lie thereon. Another kind of the double strollers uses a quasi-bunk design. Such double strollers also have an advantage of saving space. Furthermore, such double strollers have an advantage of light and handy structure relative to the above-mentioned side-by-side strollers. The disadvantage thereof is that the child on the lower bunk may feel oppressed in vision. Besides, the children seldom interact with each other. Another kind of the double strollers uses a design of seats arranged in the front and rear with the same sitting orientation. The advantage thereof is that an accommodating basket can be disposed under the rear seat of the stroller.

In addition to their individual disadvantages, the above double strollers have a common disadvantage; that is, the seat configuration is permanent. Furthermore, if the double stroller is equipped with an accommodating basket, the accommodating space of the accommodating basket is small. It is difficult to meet various practical use requirements just by the double stroller. Therefore, a stroller with a flexible seat configuration is needed, so as to meet many use situations. For example, the rear seat can be adjustably disposed for providing different sitting orientations or sitting heights; further, the rear seat can be designed to be detachable from the stroller for obtaining an enlarged space for an accommodating basket or for a child to stand on a footrest disposed on the stroller. Even an infant safety seat can be assembled onto the stroller.

SUMMARY OF THE INVENTION

An objective of the invention is to provide a stroller which can carry two children at a time. A rear seat can be adjustably disposed for providing different sitting orientations or sitting heights so as to meet various use requirements.

According to an embodiment, the stroller includes a stroller frame, a front seat assembly, and a rear seat assembly. The stroller frame includes two side support assemblies oppositely disposed. A front seat space and a rear seat space are formed between the two side support assemblies. The front seat assembly is disposed between the two side support assemblies and located in the front seat space. The rear seat assembly is detachably and height-adjustably disposed between the two side support assemblies and located in the rear seat space. When the stroller is in use, the disposition height of the rear seat assembly can be adjusted relative to the stroller frame for a child sitting thereon, which increases the flexibility in sitting. Furthermore, when the rear seat assembly is detached from the stroller frame, the stroller can be equipped with a footrest at the lower portion of the stroller frame for a child to stand thereon, or the stroller can be equipped with an accommodating basket at the lower portion of the stroller frame so that an expansible side portion of the accommodating basket can spread upward for expanding the accommodating space of the accommodating basket. Therefore, the stroller can provide various ways of carrying children and using for meet various practical use requirements, which facilitates choices by parents and reduces the cost of buying baby carriages for child.

According to another embodiment, the stroller includes a stroller frame, a front seat assembly, a rear seat structure, and an accommodating basket. The stroller frame includes two side support assemblies disposed oppositely. A front seat space and a rear seat space are formed between the two side support assemblies. The front seat assembly is disposed between the two side support assemblies and located in the front seat space. The rear seat structure is moveably disposed between the two side support assemblies and located in the rear seat space. The accommodating basket is disposed between the two side support assemblies and located under the front seat assembly. The accommodating basket includes a main portion and an expansible side portion connected to the main portion. The main portion forms an accommodating space. The rear seat structure is moveable relative to the stroller frame, for example by detaching the rear seat structure from the stroller frame or by rotating-and-lifting or lifting-and-folding the rear seat structure relative to the stroller frame toward the front seat assembly, such that the expansible side portion is capable of spreading upward to be fixed on the two side support assemblies so as to extend the accommodating space upward into the rear seat space. Therefore, when the rear seat structure is not in use (e.g. only one child sits on the front seat assembly), the stroller can effectively use the space of the stroller.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
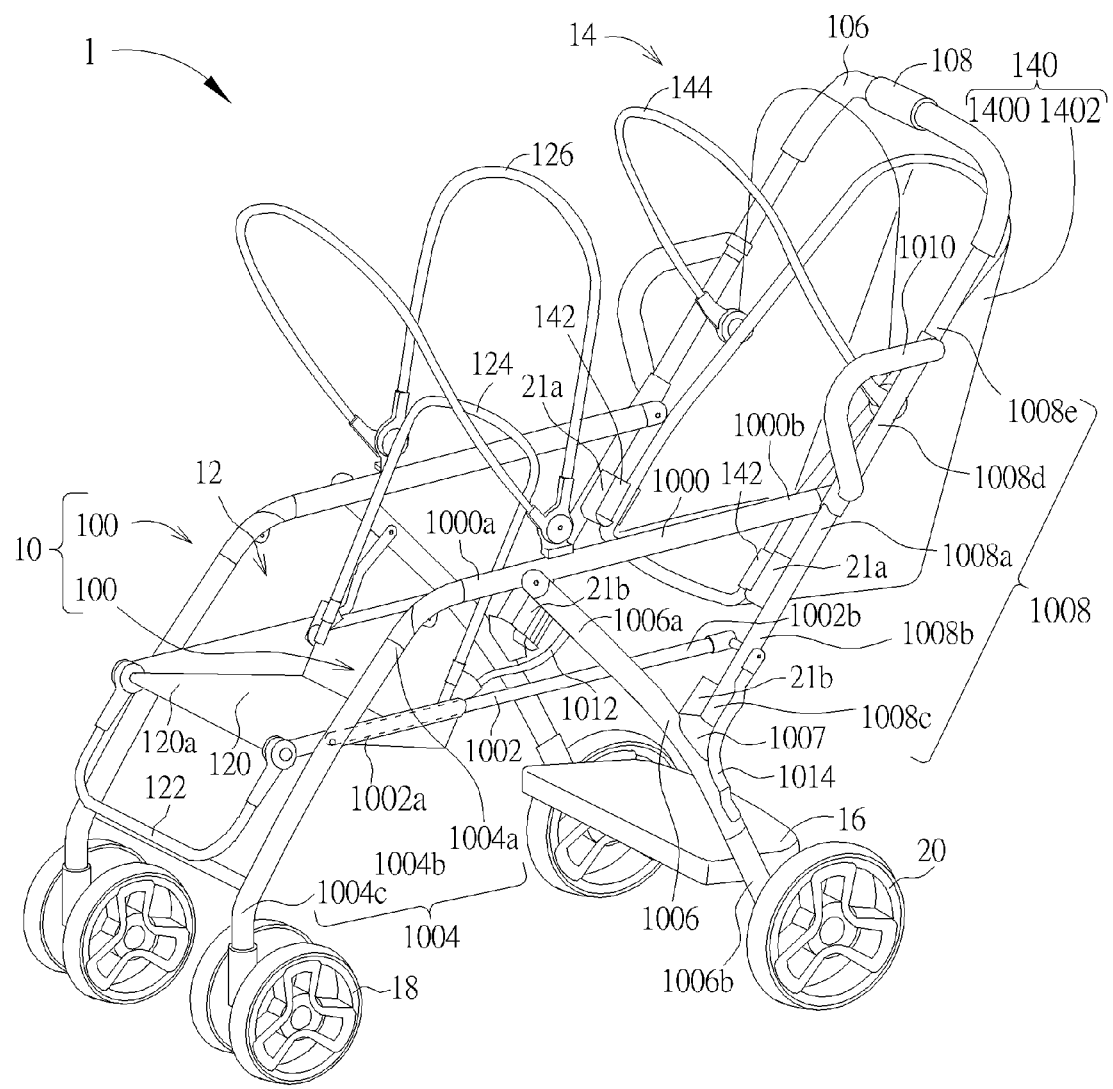
FIG. 1 is a schematic diagram illustrating a stroller of a preferred embodiment according to the invention.
Figure 2:
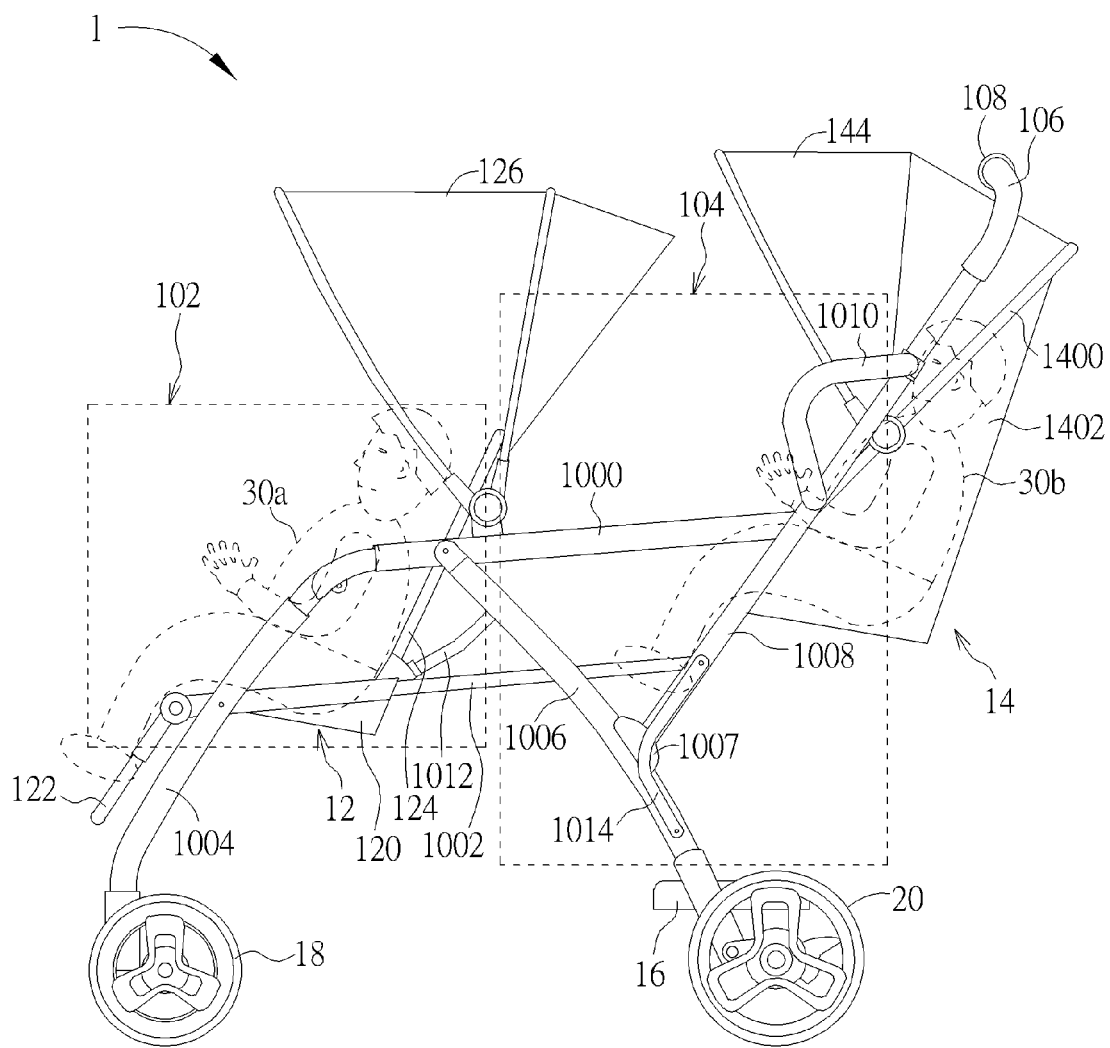
FIG. 2 is a side view of the stroller in FIG. 1.

Please refer to FIG. 1 and FIG. 2. FIG. 1 is a schematic diagram illustrating a stroller 1 of a preferred embodiment according to the invention. FIG. 2 is a side view of the stroller 1. Therein, for description convenience, some hidden portions of some components are still illustrated by hidden lines. The stroller 1 is a double stroller and includes a stroller frame 10, a front seat assembly 12, a rear seat assembly 14, a footrest 16, two front wheels 18, and two rear wheels 20; therein, the front seat structure of the stroller 1 is realized by the front seat assembly 12; the rear seat structure of the stroller 1 is realized by the rear seat assembly 14. The stroller frame 10 includes two side support assemblies 100 oppositely disposed. A front seat space 102 and a rear seat space 104 are formed between the side support assemblies 100. The ranges thereof are indicated by dashed lines in FIG. 2. Each side support assembly 100 is connected with one front wheel 18 and one rear wheel 20 at the bottoms of the front and rear sides thereof. The front seat assembly 12 is disposed between the side support assemblies 100 and located in the front seat space 102. The rear seat assembly 14 is detachably and height-adjustably disposed between the side support assemblies 100 and located in the rear seat space 104. The engagement of the rear seat assembly 14 with the stroller frame 10 will be described in detail later. The footrest 16 is disposed between the side support assemblies 100 and located under the rear seat space 104. When the stroller 1 is in use, the front seat assembly 12 and the rear seat assembly 14 thereon sit two children 30a and 30b respectively (illustrated by dashed lines in FIG. 2). Therein, the child 30a is located in the front seat space 102; the child 30b is located in the rear seat space 104.

Further, each side support assembly 100 includes an upper side bar 1000, a lower side bar 1002, a front leg 1004, a rear leg 1006, a push bar 1008, and a hand bar 1010. An upper end portion 1004a of the front leg 1004 is pivotally connected to a front end portion 1000a of the upper side bar 1000. A middle portion 1004b of the front leg 1004 is pivotally connected to a front end portion 1002a of the lower side bar 1002. A lower end portion 1004c of the front leg 1004 is connected to the front wheel 18. An upper end portion 1006a of the rear leg 1006 is pivotally connected to a middle portion of the upper side bar 1000. A lower end portion 1006b of the rear leg 1006 is connected to the rear wheel 20. The upper side bar 1000 and the lower side bar 1002 are disposed in parallel. The footrest 16 is disposed on and between lower end portions 1006b of the rear legs 1006. A middle portion 1008a of the push bar 1008 is pivotally connected to a rear end portion 1000b of the upper side bar 1000. A lower portion 1008b of the push bar 1008 is pivotally connected to a rear end portion 1002b of the lower side bar 1002. A lower end portion 1008c of the push bar 1008 is detachably connected to and locked with the rear leg 1006 by a locking mechanism 1007. The hand bar 1010 is disposed on an upper portion 1008d of the push bar 1008 (i.e. higher than the connection where the upper side bar 1000 is pivotally connected to the push bar 1008) and located substantially above the footrest 16. In the embodiment, each side support assembly 100 further includes a front connection member 1012 and a rear connection member 1014. Two ends of the front connection member 1012 are pivotally connected to the lower side bar 1002 and the rear leg 1006 respectively. Two ends of the rear connection member 1014 are pivotally connected to the rear leg 1006 and the push bar 1008 respectively. Therefore, by the pivotal connections of the front connection member 1012 and the rear connection member 1014, the stroller frame 1 can be unfolded more steadily and folded more smoothly. In addition, the stroller frame 10 further includes a handle bar 106, two ends of which are connected to two upper end portions 1008e of the push bars 1008 of the two side support assemblies 100. A manipulation part 108 can be disposed on the handle bar 106 to be manipulated to release a locking state of the push bar 1008 with the rear leg 1006 by the locking mechanism 1007 so that the stroller 1 can be folded.

The front seat assembly 12 includes a front seat plate 120, a leg rest assembly 122, and a back rest tube 124. The front seat plate 120 is connected across on and between the lower sidebars 1002. The leg rest assembly 122 is pivotally connected to a front end portion 120a of the front seat plate 120. The back rest tube 124 is pivotally connected to the lower side bars 1002. The stroller frame 10 together with the front seat plate 120 and the back rest tube 124 form a sitting space for the child 30a. When the stroller 1 is unfolded, the back rest tube 124 is slantedly disposed relative to the lower side bars 1002. During a folding of the stroller 1, the back rest tube 124 is rotated as the lower side bars 1002 rotates. In the embodiment, the front seat assembly 12 further includes a canopy 126 (illustrated only by its skeleton in FIG. 1 for illustrating the structure of the stroller 1 clearly) disposed on the upper side bars 1000 for shielding the child 30a from sunshine or rain.

Figure 3:
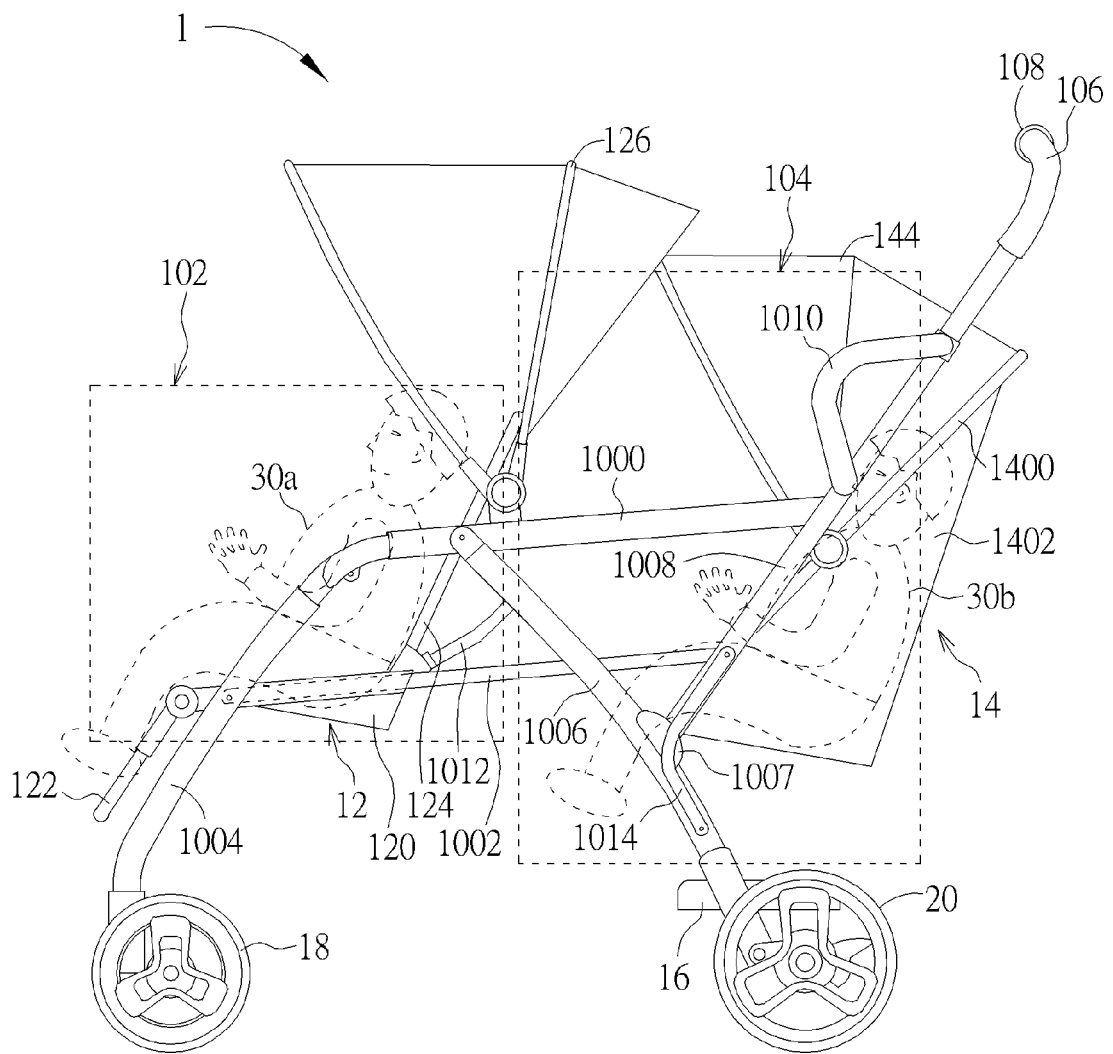
FIG. 3 is a side view of the stroller in FIG. 1 with engaging parts engaged with lower mountings.

The rear seat assembly 14 includes a rear seat part 140 and a pair of engaging parts 142. The rear seat part 140 includes a peripheral frame 1400 and a support member 1402 connected to the peripheral frame 1400 (for example a cloth, the circumference of which is sewed onto the peripheral frame 1400). The engaging parts 142 are disposed on two opposite sides of the rear seat part 444, i.e. two opposite sides of the peripheral frame 4440. In the embodiment, the engaging parts 446 are mounted on a lower portion of the peripheral frame 4440, but the invention is not limited thereto. The stroller 1 further includes a pair of upper mountings 21a and a pair of lower mountings 21b. The upper mountings 21a are symmetrically mounted on the push bars 1008; the lower mountings 21*b* are symmetrically mounted on the push bars 1008 lower than the upper mountings 21*a*. The engaging parts 142 are capable of selectively being engaged with the upper mountings 21*a* or the lower mountings 21*b*. In FIG. 1 and FIG. 2, the engaging parts 142 are engaged with the upper mountings 21*a* so that the position of the child 30*b* is higher than that of the child 30*a*, so the child 30*b* has a higher vision. When the engaging parts 142 are engaged with the lower mountings 21*b*, the position of the child 30*b* is slightly lower than that of the child 30*a*, as shown by FIG. 3. In other words, in the embodiment, the rear seat assembly 14 and the front seat assembly 12 are disposed in different heights relative to the stroller frame 10; however, the invention is not limited thereto. Therefore, the rear seat assembly 14 uses a design of adjustable disposition for diversifying the sitting of child. In practice, the stroller 1 can be equipped with more mountings thereon for the engaging parts 142 to engage with, which enhances the diversification of sitting. In addition, in practice, an engagement mechanism with adjustable disposition angle can be used to engage the rear seat assembly 14 with the stroller frame 10 so that the slanted angle of the rear seat part 140 can be adjusted so as to diversify the disposition of the rear seat assembly 14. In addition, in the embodiment, the sitting orientations of the rear seat assembly 14 and the front seat assembly 12 are the same, but the invention is not limited thereto. For example, the rear seat part 140 can be disposed backward on the upper mountings 21*a*, which facilitates caring by parents.

Figure 4:
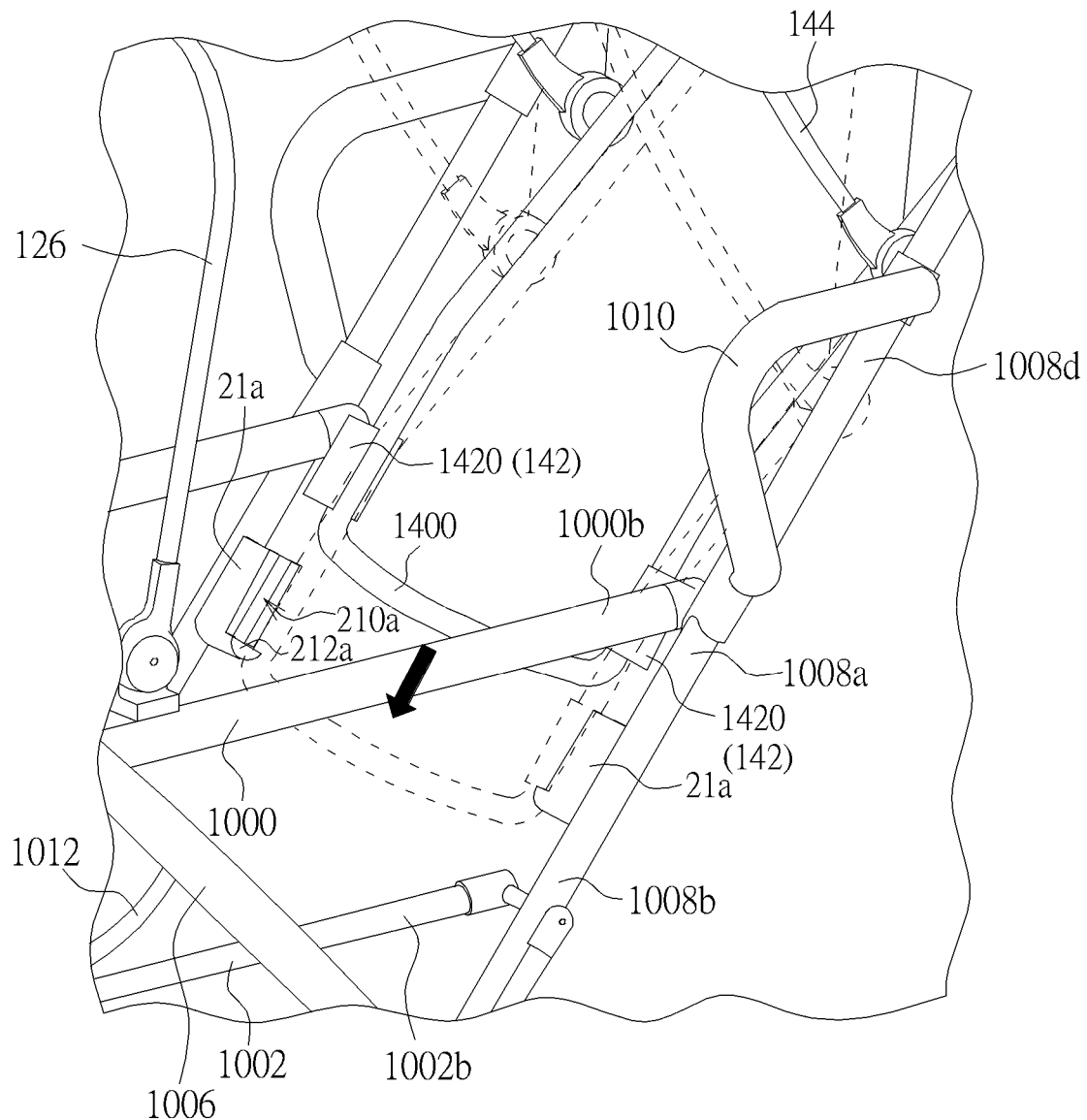
FIG. 4 is a side view of the stroller in FIG. 1 with the engaging parts engaged with upper mountings.

Please also refer to FIG. 4, which is a schematic diagram illustrating the engaging parts 142 are engaged with the upper mountings 21*a*. In the embodiment, the engaging parts 142 are engaged with the upper mountings 21*a* or the lower mountings 21*b* in a slidably engaging way. The engaging part 142 includes a slider 1420. The upper mounting 21*a* includes a sliding slot 210*a* and a blocking structure 212*a*. The slider 1420 slides downward into the sliding slot 210*a* until the slider 1420 is blocked by the blocking structure 212*a*, so that the engaging parts 142 are engaged with the upper mountings 21*a*. When the engaging parts 142 are required to be detached from the upper mountings 21*a*, it is applicable by performing the above operation reversely. The above description also applies to the engaging parts 142 engaging with or detaching from the lower mountings 21*b* and will not repeated in addition. The above is just an embodiment for the slidably engaging way; the slidably engaging way of the invention is not limited thereto. In addition, the engagement of the engaging parts with the upper mountings and the lower mountings of the invention is not limited to the slidably engaging way. In practice, the engagement can be realized by other ways such as hook, snap lock, screws and so on.

Figure 5:
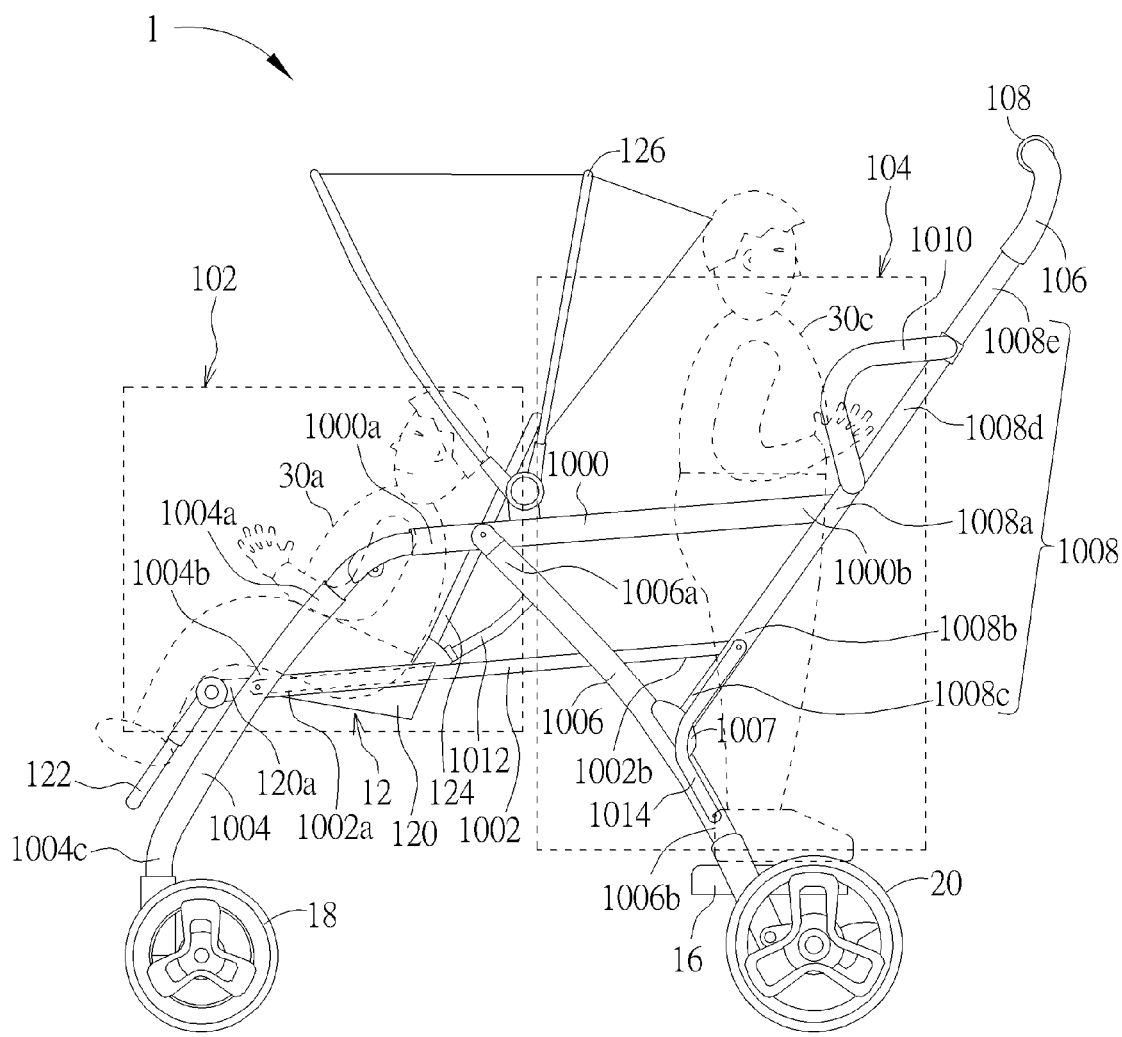
FIG. 5 is a side view of the stroller in FIG. 1 after a rear seat assembly is detached from a stroller frame of the stroller.

In addition, the rear seat assembly 14 further includes a canopy 144 (illustrated only by its skeleton in FIG. 1 for illustrating the structure of the stroller 1 clearly) disposed on the peripheral frame 1400 for shielding the child 30*b* sitting on the rear seat assembly 14 from sunshine or rain. It is added that in the embodiment, the front seat assembly 12 and the rear seat assembly 14 are disposed in the front and back like a tandem stroller. Please refer to FIG. 5, which is a side view of the stroller 1 in FIG. 1 after the rear seat assembly 14 is detached from the stroller frame 10. When the rear seat assembly 14 is detached from the stroller frame 10, the rear seat space 104 still can be used by the stroller frame 10 to carry a child 30*c*. In the moment, the child 30*c* can stand forward or backward on the footrest 16. The child 30*c* can grip the push bars 1008 or the hand bars 1010 for balance and safety. In general, in practice, the child 30*a* is usually a younger child; the child 30*c* is usually an older child.

Figure 6:
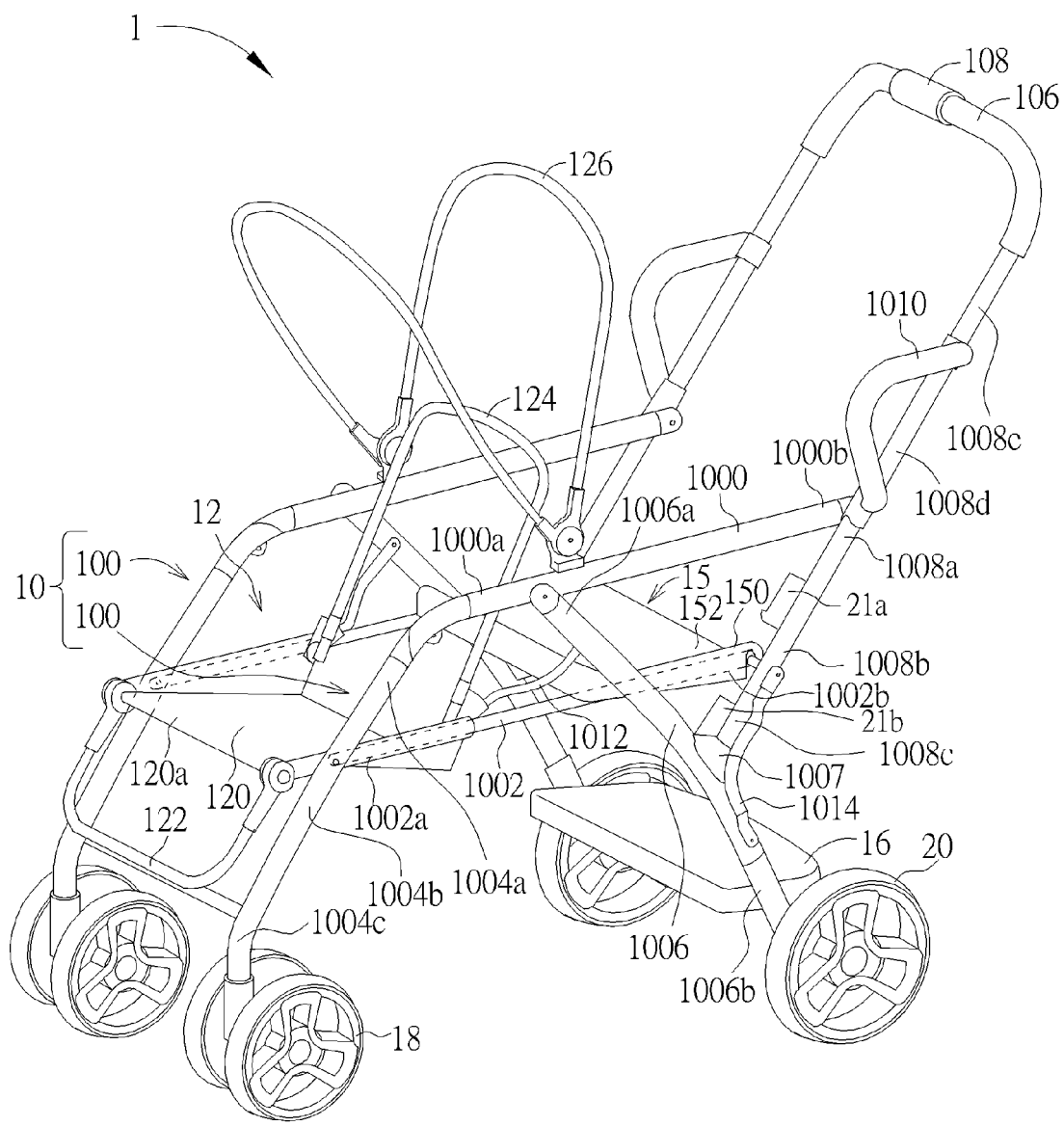
FIG. 6 is a schematic diagram illustrating the stroller in FIG. 1 after the rear seat assembly is detached from the stroller frame.
Figure 7:
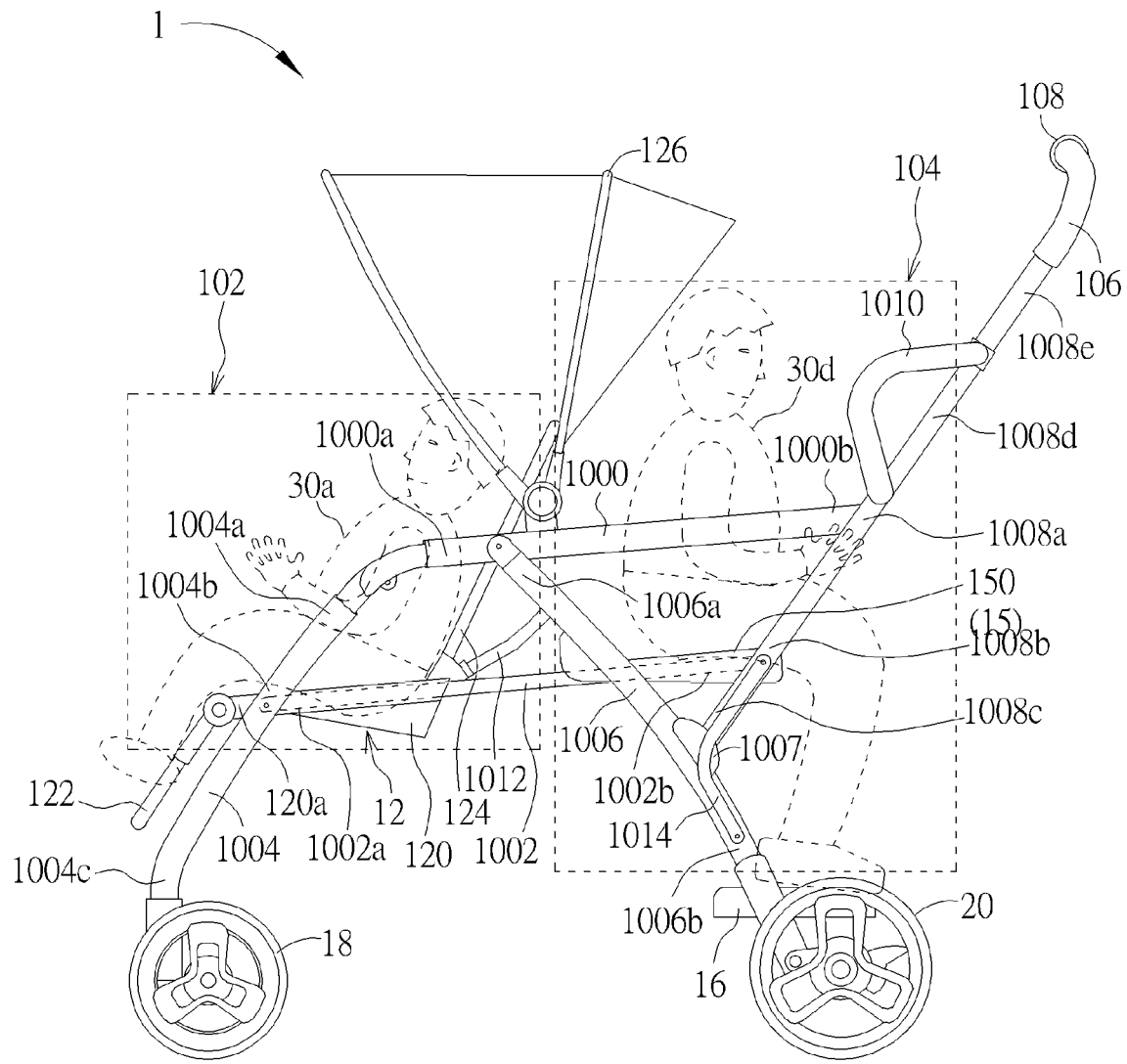
FIG. 7 is a side view of the stroller in FIG. 6.

Please refer to FIG. 6 and FIG. 7. FIG. 6 is a schematic diagram illustrating the stroller 1 in FIG. 1 after the rear seat assembly 14 is detached from the stroller frame 10. FIG. 7 is a side view of the stroller 1 in FIG. 6. In the embodiment, because the rear seat assembly 14 is primarily engaged with the push bar 1008, the portions of the upper side bars 1000 and the lower side bars 1002 located at the back of the front seat assembly 12 still can be used. The stroller 1 further can include a rear seat plate 15 moveably connected to and between the lower side bars 1002 and located in the rear seat space 104 (referring to FIG. 2). Therefore, the front seat plate 120 and the back rest tube 124 provide a forward sitting for child cooperatively. When the rear seat assembly 14 is detached from the stroller frame 10, the rear seat plate 15 and the footrest 16 provide a backward sitting for child cooperatively. Therein, the footrest 16 can be used by a child 30*d* sitting on the rear seat plate 15 to put his feet thereon. The backward-sitting child 30*d* can grip the upper side bars 1000, the push bars 1008, or the hand bars 1010 for balance and safety. In general, in practice, the child 30*a* is usually a younger child; the child 30*d* is usually an older child.

Figure 8:
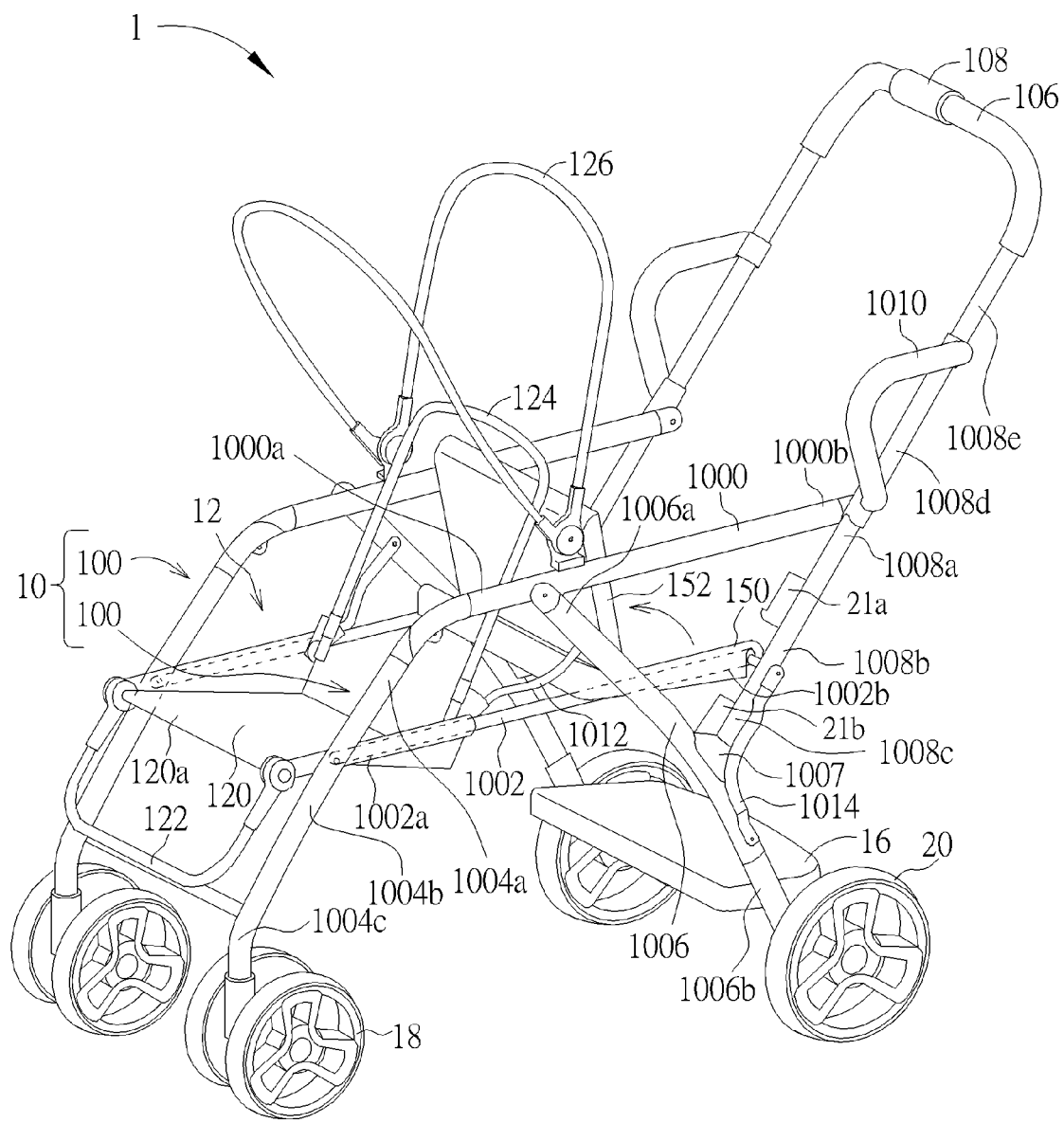
FIG. 8 is a schematic diagram illustrating a rear seat plate of the stroller in FIG. 6 is lifted.

When the rear seat assembly 14 is engaged on the stroller frame 10, the rear seat plate 15 can be moved as request to release space for the child 30*b*, or when the rear seat plate 15 is no longer needed, the rear seat plate 15 can be moved to release space for the child 30*c*. For the above cases, the rear seat plate 15 can be detachably disposed, so that the rear seat plate 15 can be detached directly from the stroller frame 10. However, the invention is not limited thereto. As shown by FIG. 8, in the embodiment, the rear seat plate 15 includes a supporting frame 150 and a liftable seat plate portion 152. The supporting frame 150 is disposed on and between the two lower side bars 1002. The liftable seat plate portion 152 is pivotally connected to the supporting frame 150. The liftable seat plate portion 152 can be supported by the supporting frame 150 for child to sit thereon. The liftable seat plate portion 152 can be lifted toward the back rest tube 124. In the moment, the rear seat plate 15 can release space for children 30*b* and 30*c*, for example the cases of carrying children 30*b* and 30*c* shown by FIG. 2, FIG. 3, and FIG. 5.

Figure 9:
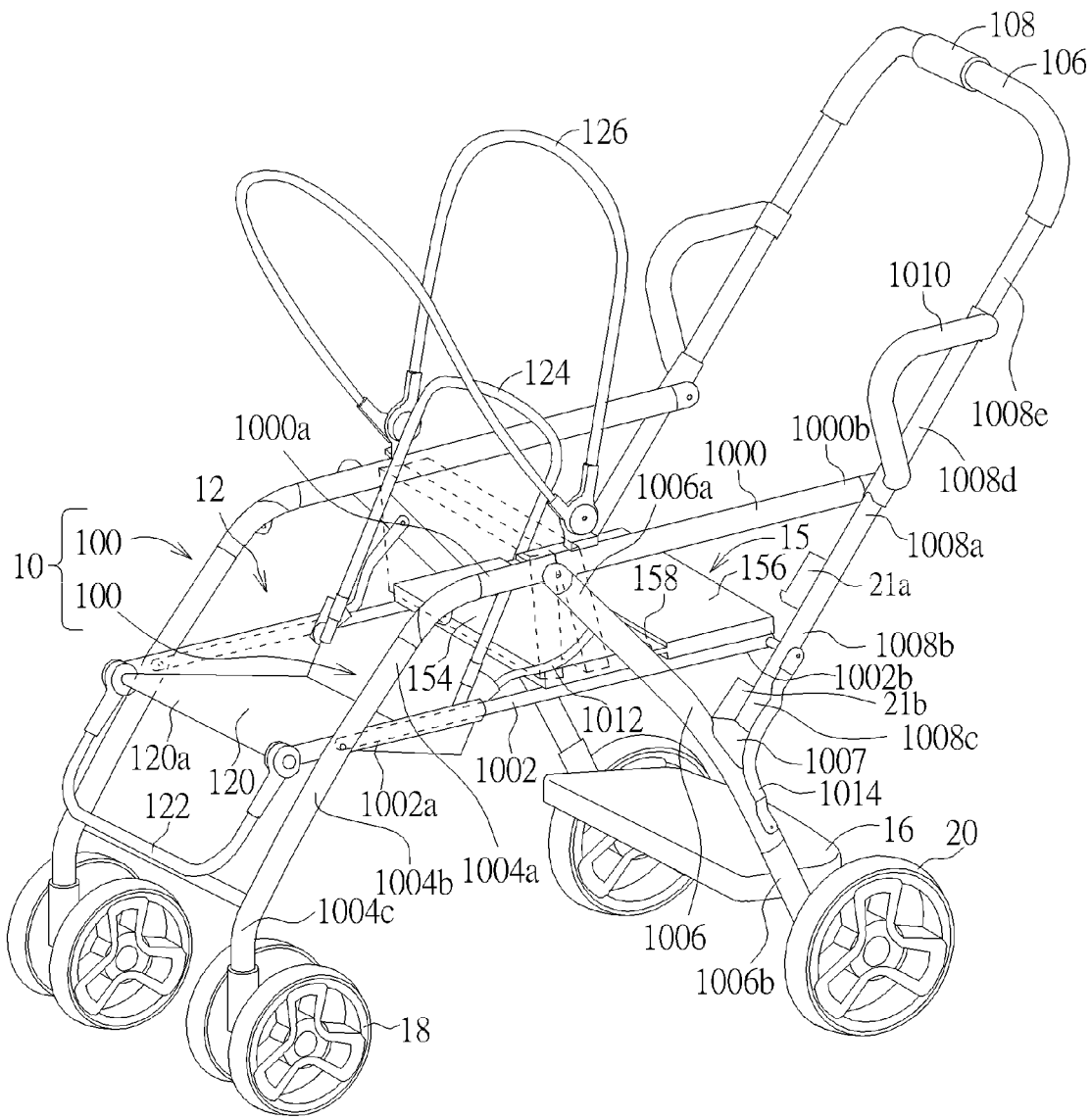
FIG. 9 is a schematic diagram illustrating a rear seat plate of the stroller in FIG. 6 is lifted and folded.
Figure 10:
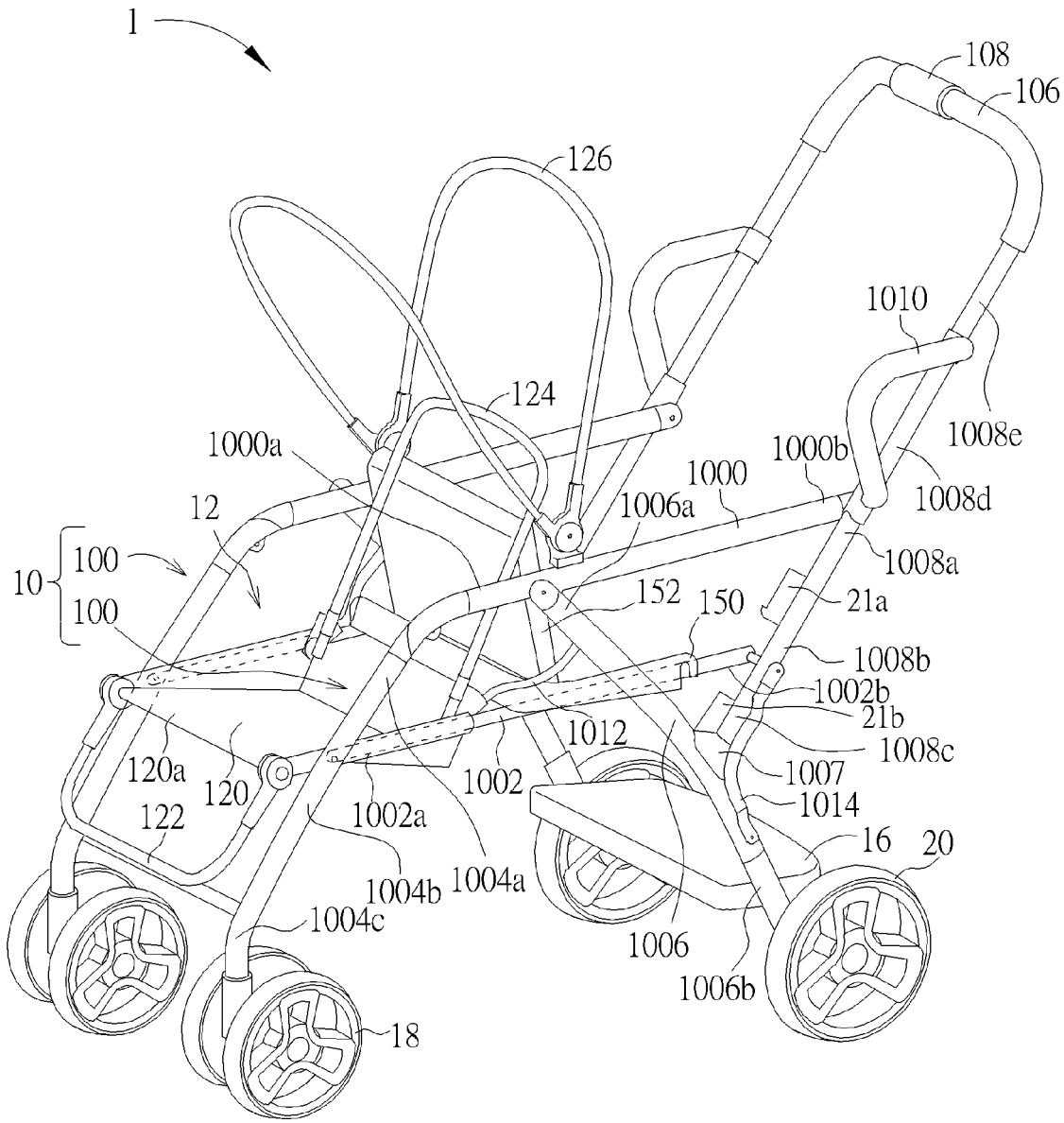
FIG. 10 is a schematic diagram illustrating the rear seat plate in FIG. 8 is moved backward.

In another embodiment, as shown by FIG. 9, the rear seat plate 15 includes a first plate member 154, a second plate member 156, and a connection member 158 primarily. The first plate member 154 is pivotally connected to and between the two lower side bars 1002. The second plate member 156 is connected to the first plate member 154 by the connection member 158. Therein, the connection member 158 can be made of soft and flexible materials, or be a hinge connecting the first plate member 154 and the second plate member 156. The first plate member 154 and the second plate member 156 can spread to be substantially a flat plate to be supported by the two lower side bars 1002 for child to sit thereon. When the rear seat plate 15 is required to release space, the first plate member 154 and the second plate member 156 can be lifted and folded by the connection member 158, as shown by the dashed lines in FIG. 9. In the moment, the rear seat plate 15 releases space for children 30*b* and 30*c* therefore, as the cases of carrying children 30*b* and 30*c* shown by FIG. 2, FIG. 3, and FIG. 5. It is added that in practice, the supporting frame 150 of the rear seat plate 15 and the first plate member 154 can be designed to be capable of relatively sliding on the two lower side bar 1002, so that when the liftable seat plate portion 152 is lifted and the first plate member 154 and the second plate member 156 are lifted and folded toward the back rest tube 124, the rear seat plate 15 can be moved toward the back rest tube 124 further so as to release more space. As shown by FIG. 10, because the supporting frame 150 is slidably disposed on and between the two lower side bars 1002, when the liftable seat plate portion 152 is lifted, the supporting frame 150 can be moved toward the back rest tube 124. In addition, both the rear seat assembly 14 and the rear seat plate 15 belong to the rear seat structure of the double stroller, so in practice, it is applicable by choosing one of them.

Figure 11:
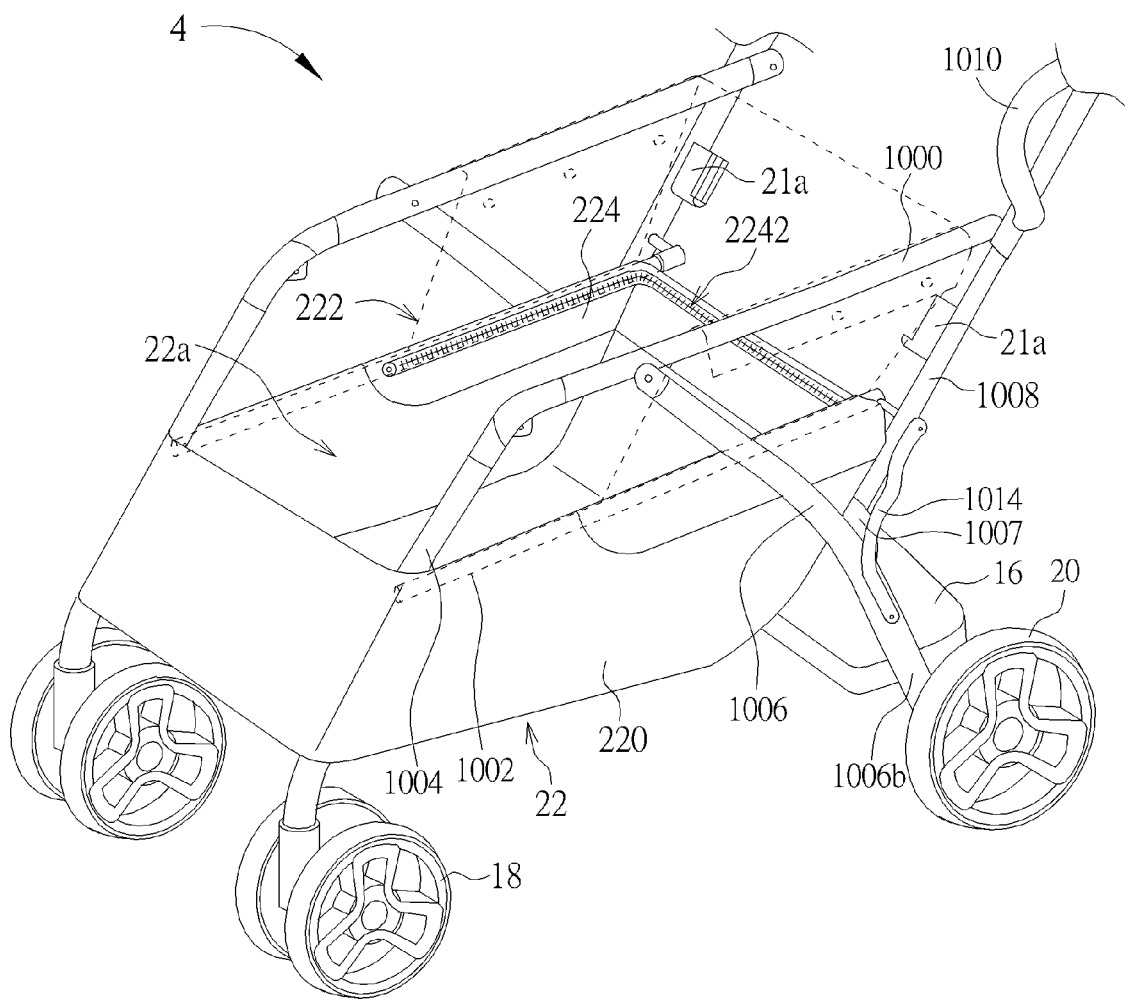
FIG. 11 is a schematic diagram illustrating a portion of a stroller of another embodiment according to the invention.

Please refer to FIG. 11, which is a schematic diagram illustrating a portion of a stroller 4 of another embodiment according to the invention. The stroller 4 is structurally similar to the stroller 1. For simple illustration, the stroller 4 still uses the component notations of the stroller 1. The main difference between the stroller 4 and the stroller 1 is that the stroller 4 further includes an accommodating basket 22 (shown by dashed lines in FIG. 11) disposed on and between the two lower side bars 1002 and located under the front seat plate 120. Therein, for illustrating the structure of the accommodating basket 22 clearly, the front seat assembly 12, the rear seat assembly 14, and the rear seat plate 15 are not shown in FIG. 11. Besides, for simple description, the following will focus on the accommodating basket 22. For other descriptions about the stroller 4, please refer to the relevant descriptions of the above-mentioned stroller 1; they will not be described in addition.

In the embodiment, the accommodating basket 22 includes a main portion 220, an expansible side portion 222 connected to the main portion 220, and a storage bag 224 disposed at an upper edge portion of the main portion 220. The main portion 220 forms an accommodating space 22a. The expansible side portion 222 is stored in the storage bag 224 and capable of spreading upward from the storage bag 224. When the rear seat assembly 14 is detached from the stroller frame 10, the rear seat plate 15 is moved to release space, and only the front seat assembly 12 is required for child to sit thereon, the expansible side portion 222 can be pulled out from the storage bag 224 through an opening 2242 of the storage bag 224 (with a zip, buttons, or other methods of opening or closing the opening 2242) to spread upward to be fixed on the upper side bars 1000 (as shown by dashed lines in FIG. 11), so that the accommodating space 22a extends upward into the rear seat space 104; that is, the accommodating space 22a expands for accommodating more goods. Therefore, the stroller 4 can also be taken as a shopping cart. In logic, the upward spreading of the expansible side portion 222 can be regarded as an extension of the sides of the accommodating basket 22. The fixing of the expansible side portion 222 on the upper side bars 1000 can be performed by buttons, Velcro straps, snap buttons, zips and so on. In the embodiment, the expansible side portion 222 wraps the upper side bars 1000 to be fixed by its buttons, but the invention is not limited thereto. For example, buttons are disposed on the upper side bars 1000; buttonholes are correspondingly disposed on the expansible side portion 222. The expansible side portion 222 can be fixed directly on the upper side bars 1000 accordingly. For another example, two mating parts of a snap button are disposed on the upper side bar 1000 and the expansible side portion 222 correspondingly. The expansible side portion 222 can be fixed directly on the upper side bar 1000 accordingly. Therefore, the space of the stroller frame 10 can be used effectively. Therein, the embodiments and the mechanism of releasing space by moving for the rear seat plate 15 can refer to the above descriptions and FIGS. 8 through 10 and will not be described in addition. Furthermore, the rear seat plate 15 and the main portion 220 are disposed by the two lower side bars 1002. People in the art can properly arrange structural disposition of the rear seat plate 15 and the main portion 220 on the two lower side bars 1002 such that the rear seat plate 15 and the expansible side portion 222 can act as expected, which will not be described in addition. For example, the rear seat plate 15 is disposed on the main portion 220. The opening 2242 is disposed by shifting downward relative to the two lower side bars 1002 in a small distance. Such structural arrangement can easily avoid possible structural interference of the rear seat plate 15 and render the rear seat plate 15 and the expansible side portion 222 act normally. In addition, when the expansible side portion 222 is stored in the storage bag 224, the rear seat plate 15 can be restored to the state in which the child 30d can sit thereon (as shown by FIG. 7). In the moment, the accommodating basket 22 is located under the front seat plate 120 and the rear seat plate 15. The opening of the accommodating space 22a is substantially covered by the front seat plate 120 and the rear seat plate 15, which performs a protection effect on the goods accommodated in the accommodating space 22a. The operation of lifting and folding the rear seat plate 15 can be logically regarded as an operation of opening the passageway of the accommodating space 22a for taking goods from the accommodating space 22a.

Figure 12:
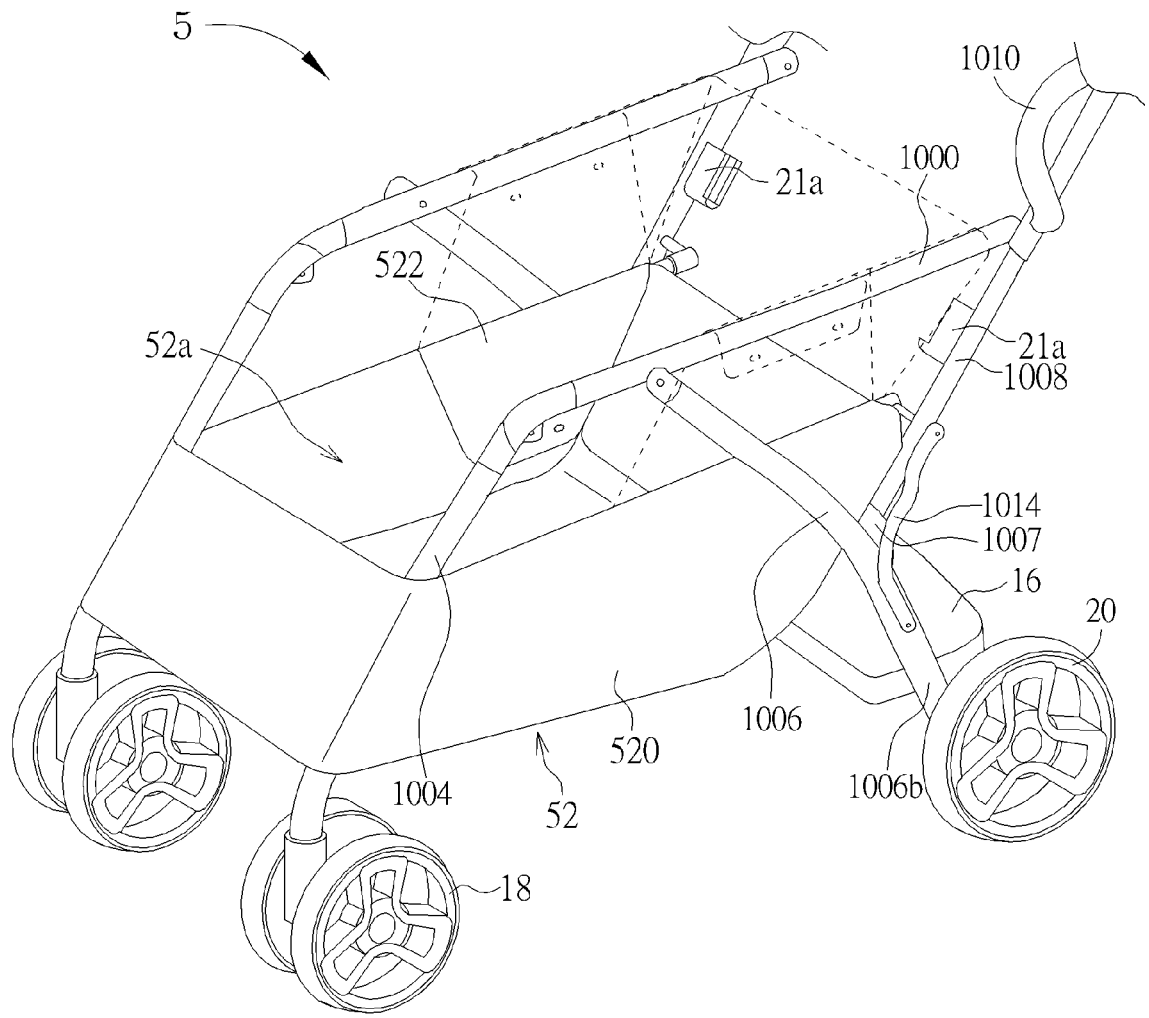
FIG. 12 is a schematic diagram illustrating a portion of a stroller of another embodiment according to the invention.

In the embodiment shown by FIG. 11, the expansible side portion 222 is stored in the storage bag 224 when not in use, but the invention is not limited thereto. Please refer to FIG. 12, which is a schematic diagram illustrating a portion of a stroller 5 of another embodiment according to the invention. The stroller 5 is structurally similar to the stroller 14. For simple illustration, the stroller 5 still uses the component notations of the stroller 4. Therein, for illustrating the structure of the accommodating basket 52 clearly, the front seat assembly 12, the rear seat assembly 14, and the rear seat plate 15 are also not shown in FIG. 12. The main difference between the stroller 5 and the stroller 4 is that the expansible side portion 522 of the accommodating basket 52 of the stroller 5 is folded toward the inside of the main portion 520 to be disposed in the accommodating space 52a when not in use (for example the rear seat plate 15 needs to be disposed on the stroller frame 10). When the expansible side portion 522 is in use, the expansible side portion 522 is turned upward from the inside of the main portion 520 to be fixed on the upper side bars 1000 (shown by dashed lines in FIG. 12), so that the accommodating space 52a expands upward for accommodating more goods, so as to use the space of the stroller frame 10 more effectively. For other descriptions about the stroller 5, please refer to the relevant descriptions of the above-mentioned stroller 4; they will not be described in addition.

Figure 13:
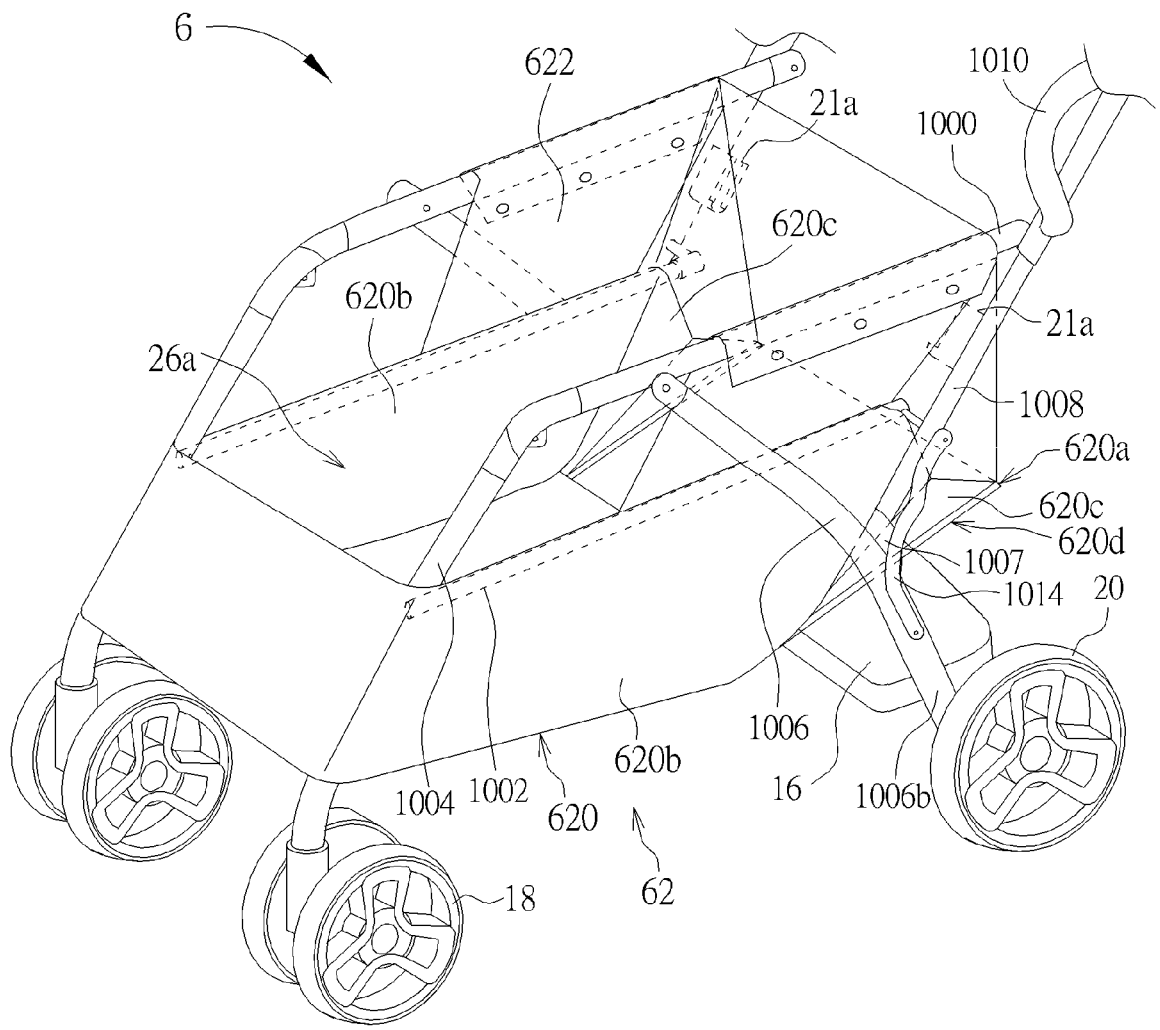
FIG. 13 is a schematic diagram illustrating a portion of a stroller of another embodiment according to the invention.

In the configurations of the above strollers 4 and 5, the accommodating baskets 22 and 52 mainly use the expansible side portions 222 and 522 to expand the accommodating spaces 22a and 52a, but the invention is not limited thereto. Please refer to FIG. 13, which is a schematic diagram illustrating a portion of a stroller 6 of another embodiment according to the invention. The stroller 6 is structurally similar to the stroller 4. For simple illustration, the stroller 6 still uses the component notations of the stroller 4. Therein, for illustrating the structure of the accommodating basket 62 clearly, the front seat assembly 12, the rear seat assembly 14, and the rear seat plate 15 are also not shown in FIG. 13. The main difference between the stroller 6 and the stroller 4 is that the main portion 620 of the accommodating basket 62 of the stroller 6 includes a rear side portion 620a, two side portions 620b, and two connection portions 620c. Two opposite edges 620d of the rear side portion 620a are detachably connected to the two side portions 620b respectively, for example by a zip, buttons and so on. The two connection portions 620c are connected to the two edges 620d of the rear side portion 620a and the two side portions 620b respectively and are foldable. The expansible side portion 622 of the accommodating basket 62 is connected to the two side portions 620b, the two connection portions 620c, and the rear side portion 620a. When the two opposite edges 620d of the rear side portion 620a are separated from the two side portions 620b, the two connection portion 620c unfold and the expansible side portion 622 spreads upward so that the accommodating space 62a extends upward and expands toward the outside of the stroller frame 10 (i.e. the back side of the main portion 620) for accommodating more goods, so as to use the space of the stroller frame 10 effectively. When the expansible side portion 622 of the accommodating basket 62 of the stroller 6 is not in use (for example the rear seat plate 15 needs to be disposed on the stroller frame 10), the expansible side portion 622 is folded toward the inside of the main portion 620 to be disposed in the accommodating space 52a or is stored by other ways. In the moment, the two opposite edges 620d of the rear side portion 620a can be kept in being separate from or jointed with the two side portions 620b. For other descriptions about the stroller 6, please refer to the relevant descriptions of the above-mentioned stroller 4; they will not be described in addition.

Figure 14:
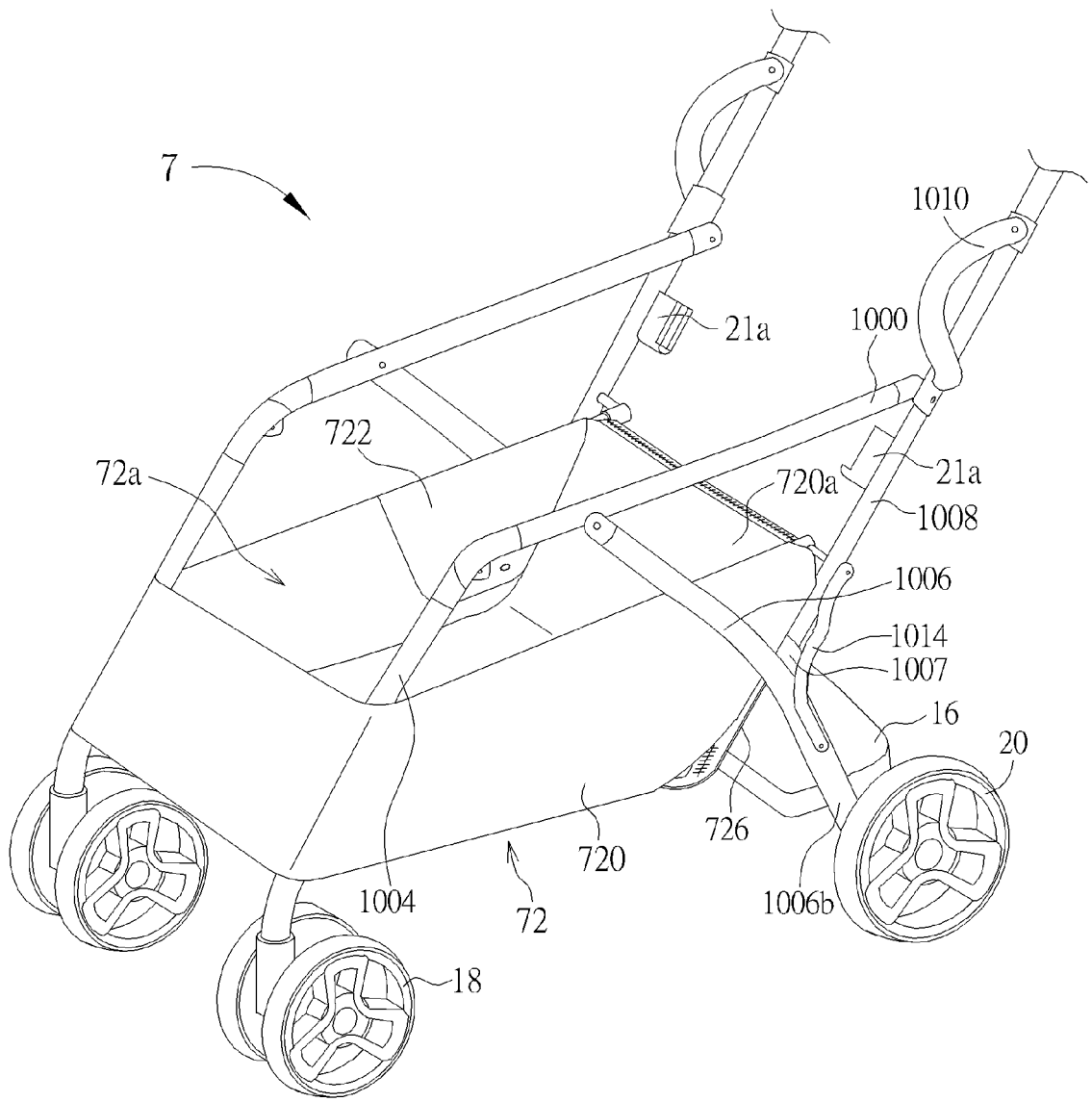
FIG. 14 is a schematic diagram illustrating a portion of a stroller of another embodiment according to the invention.
Figure 15:
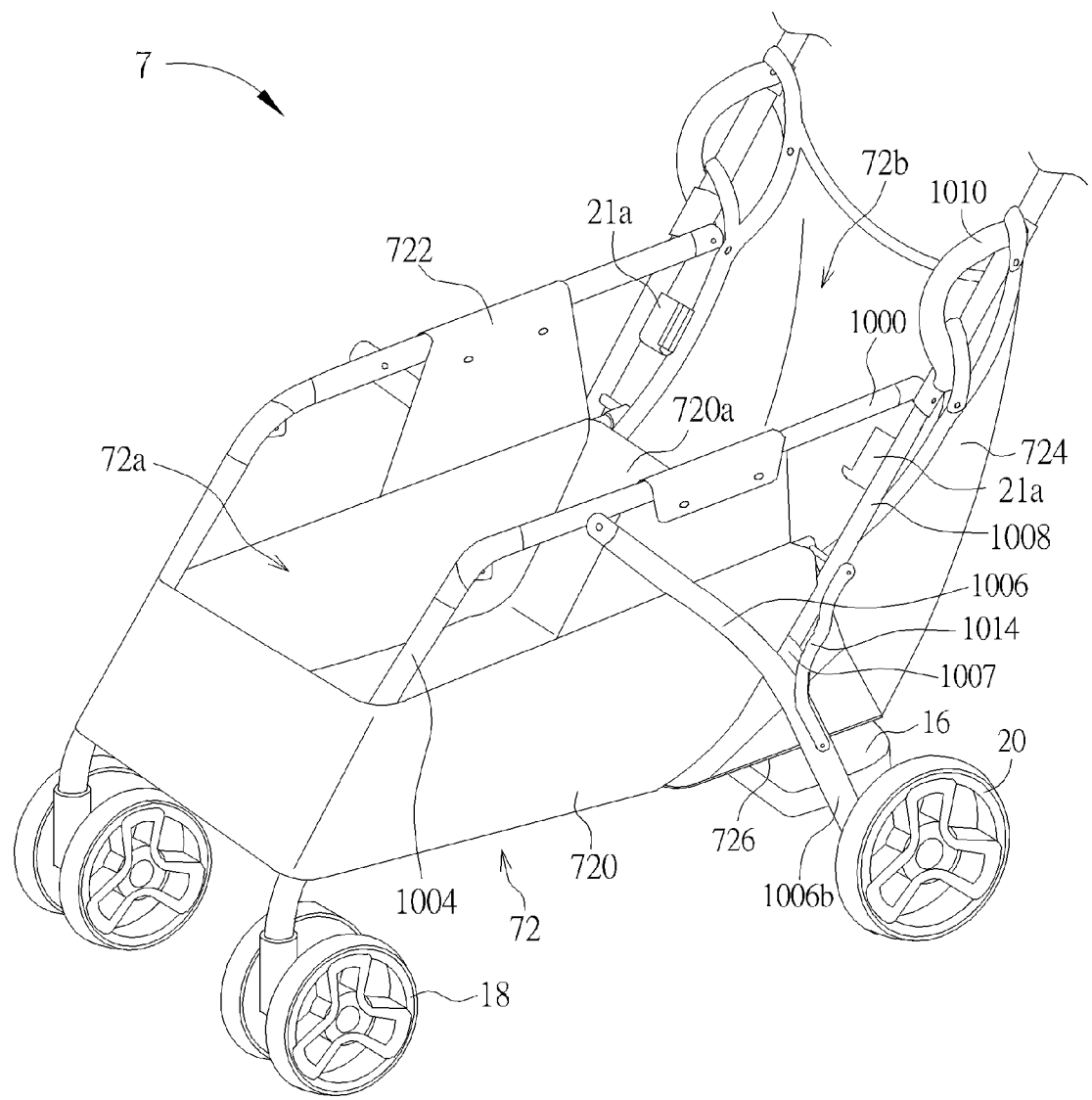
FIG. 15 is a schematic diagram illustrating the stroller in FIG. 14 after an accommodating space of an accommodating basket of the stroller expands.

In the configurations of the above strollers 4, 5 and 6, the accommodating baskets 22, 52 and 62 increase accommodating space by expanding the accommodating spaces 22a, 52a and 62a, but the invention is not limited thereto. Please refer to FIG. 14 and FIG. 15. FIG. 14 is a schematic diagram illustrating a portion of a stroller 7 of another embodiment according to the invention. FIG. 15 is a schematic diagram illustrating the stroller 7 in FIG. 14 after the accommodating space 72a of the accommodating basket 72 of the stroller 7 expands. Therein, for illustrating the structure of the accommodating basket 72 clearly, the front seat assembly 12, the rear seat assembly 14, and the rear seat plate 15 are also not shown in the figures. The stroller 7 is structurally similar to the stroller 5. For simple illustration, the stroller 6 still uses the component notations of the stroller 5. The main difference between the stroller 7 and the stroller 5 is that the accommodating basket 72 of the stroller 7 further includes a net bag 724 and a partition plate 726. The partition plate 726 is partially separably connected to a rear side portion 720a of the main portion 720 outside the main portion 720. For example, the lower edge of the partition plate 726 is fixedly connected to the rear side portion 720a; the upper, left and right edges of the partition plate 726 are detachably connected to the rear side portion 720a by a zip. The net bag 724 is connected to the main portion 720 and the partition plate 726. The net bag 724 can be stored between the partition plate 726 and the rear side portion 720a. When a portion of a circumference of the partition plate 726 is separated from the rear side portion 720a (for example by unzipping the zip), the net bag 724 can spread upward to be fixed on the push bars 1008 or the hand bars 1010 so as to form an external accommodating space 72b outside the main portion 720, as shown by FIG. 15. In addition, in the embodiment, the expansible side portion 722 of the accommodating basket 72 still can spread upward from the opposite two sides of the main portion 720, so the accommodating space 72a of the accommodating basket 72 still can obtain space expansion effect. Therefore, the stroller 7 can not only expand the original accommodating space 72a of the main portion 720 but also produce the external accommodating space 72b toward the outside of the main portion 720, so as to use the space of the stroller frame 10 more effectively. For other descriptions about the stroller 7, please refer to the relevant descriptions of the above-mentioned stroller 5; they will not be described in addition.

Figure 16:
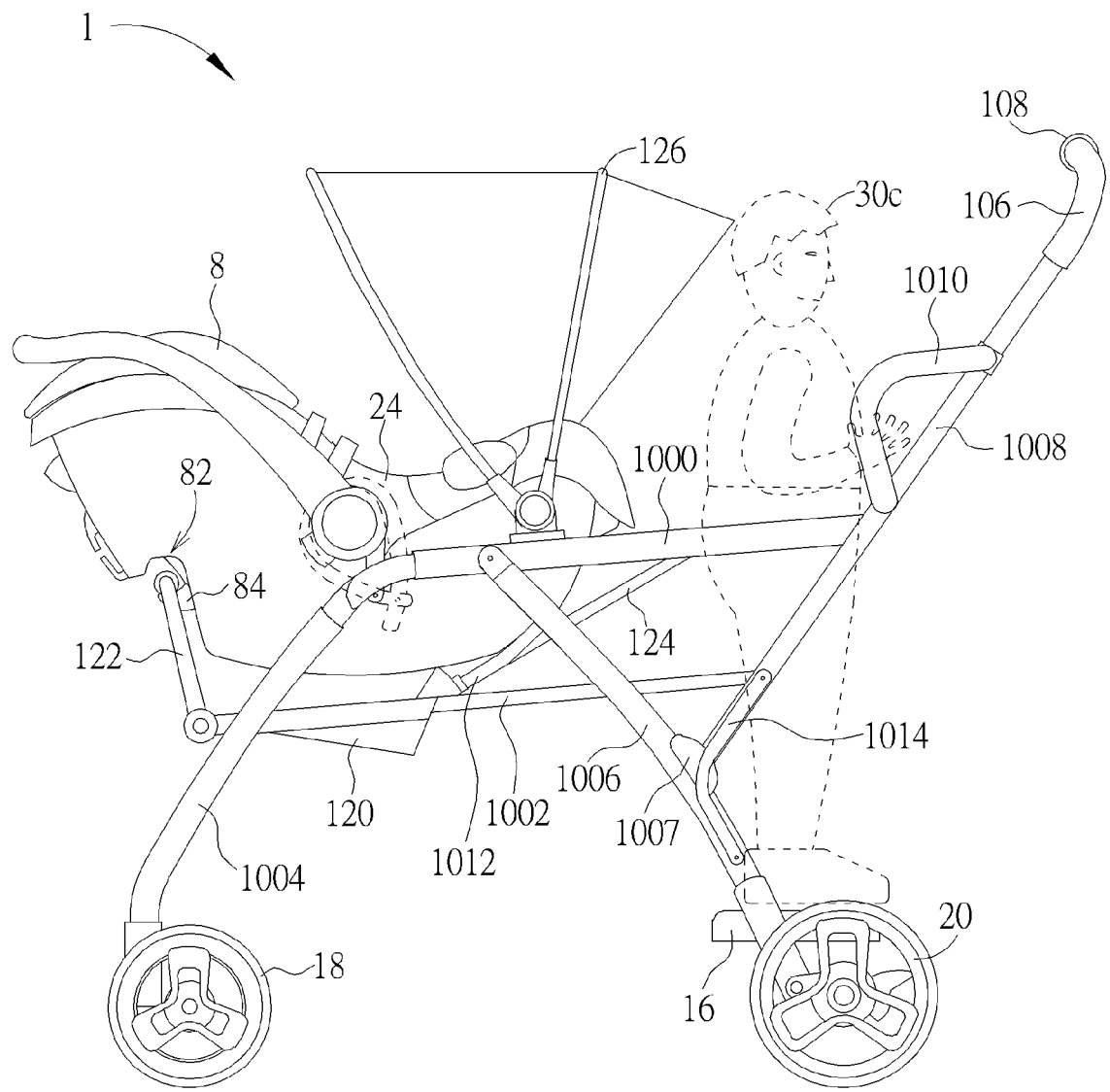
FIG. 16 is a side view of the stroller in FIG. 1 with an infant safety seat placed thereon.
Figure 17:
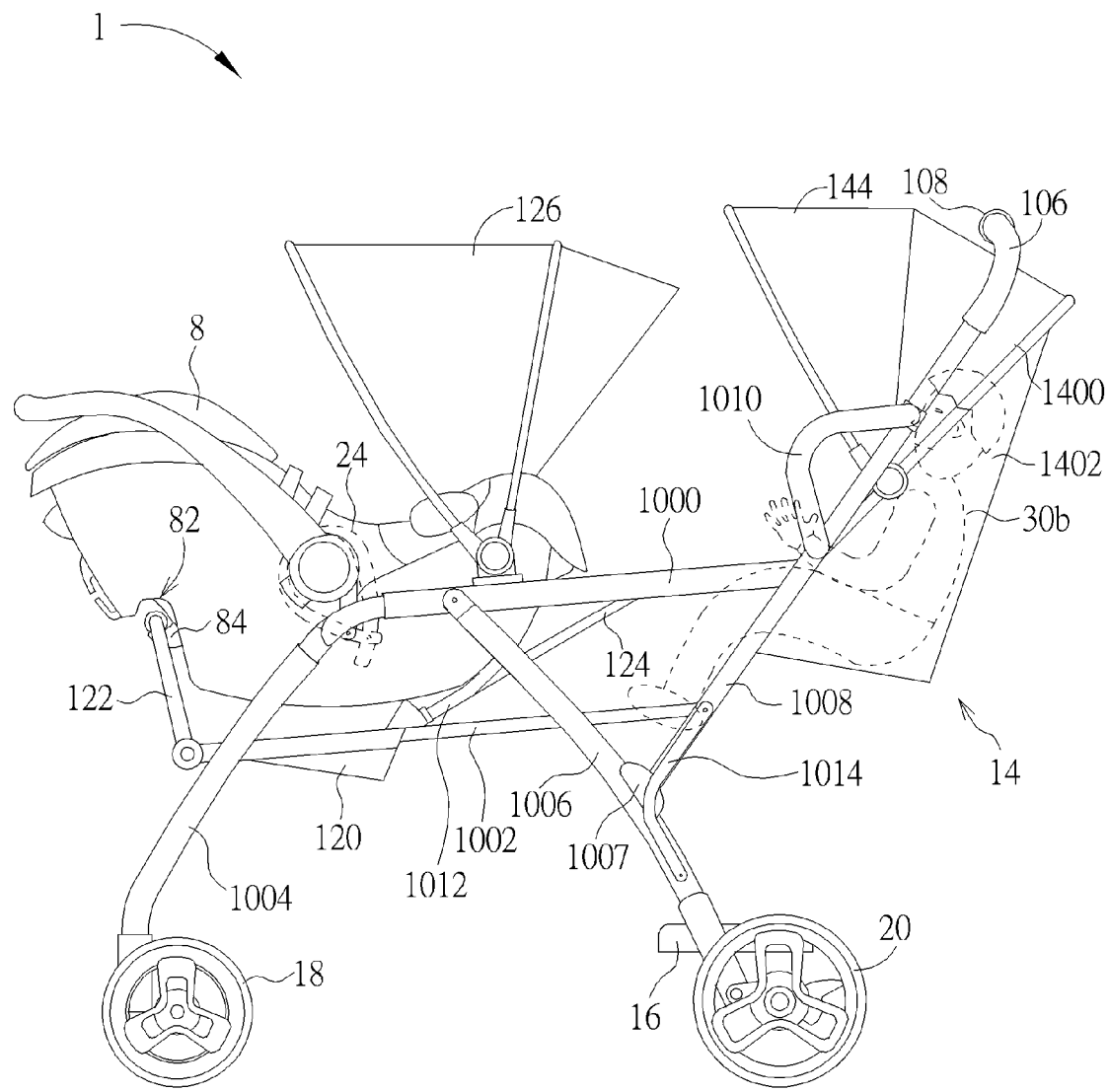
FIG. 17 is a side view of the stroller in FIG. 16 with the rear seat assembly installed thereon.

In a practical application, it may be needed to move an infant sitting on an infant safety seat onto the stroller. In the configurations of a current stroller in the prior art, a caregiver can only hold an infant up from an infant safety seat and move onto the seat of the stroller. Such movement will probably waken the infant up, leading to unnecessary bother to the infant or the caregiver. The stroller of the invention can not only provide flexible usage of the seat and the accommodating basket (as described in the above embodiments) but also allow an infant safety seat to be directly placed onto the stroller firmly, so as to avoid the above wakening issue. Please refer to FIG. 16, which is a side view of the stroller 1 (referring to FIG. 1) with an infant safety seat 8 placed thereon. Therein, the rear seat assembly 14 and the rear seat plate 15 are detached from the stroller frame 10. In general, the infant safety seat 8 includes a groove 82 and a hook 84 disposed in the groove 82. The leg rest assembly 122 is rotated upward so that when the infant safety seat 8 is placed on the front seat assembly 12, the leg rest assembly 122 can extend into the groove 82 such that the hook 84 hooks the leg rest assembly 122. For improving the stability of the infant safety seat 8 disposed on the stroller frame 10, an engagement structure can be disposed on the stroller frame 10 for engaging with the infant safety seat 8, or tow mating engagement structures are disposed at corresponding positions of the stroller frame 10 and the infant safety seat 8 respectively, even or the stroller frame 10 is provided with a fastener 24 (shown by dashed lines in FIG. 16) for fastening a structural member (e.g. a handle bar) of the infant safety seat 8 onto the stroller frame 10. As shown by FIG. 16, when the infant safety seat 8 is placed on the front seat assembly 12, a certain space of the rear seat space 104 of the stroller frame 10 is still reserved for the child 30c to forward or backward stand on the footrest 16. Alternatively, as shown by FIG. 17, a certain space is reserved between the rear seat assembly 14 and the front seat assembly 12, so the rear seat assembly 14 still can be installed on the stroller frame 10 for the child 30b to sit thereon. In the moment, the stroller 1 is still used as a double stroller.

As discussed in the above embodiments, compared with the current double stroller in the prior art, the stroller of the invention has the more flexible configuration of the rear seat, can provide proper sitting space for child, and further can be engaged with an infant safety seat, so as to meet various practical use requirements, which facilitates choices by parents and reduces the cost of buying baby carriages for child.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A stroller, comprising:
  a stroller frame comprising two side support assemblies disposed oppositely, a front seat space and a rear seat space being formed between the two side support assemblies;
  a front seat assembly disposed between the two side support assemblies and located in the front seat space;

a rear seat structure moveably disposed between the two side support assemblies and located in the rear seat space; and an accommodating basket disposed between the two side support assemblies and located under the front seat assembly, the accommodating basket comprising a main portion and an expansible side portion connected to the main portion, the main portion forming an accommodating space, the rear seat structure being moveable relative to the stroller frame such that when the stroller is in an open position, the expansible side portion is capable of spreading upward to be fixed on the two side support assemblies so as to extend the accommodating space upward into the rear seat space.

2. The stroller of claim 1, wherein the accommodating basket comprises a storage bag disposed at an upper edge portion of the main portion, and the expansible side portion is stored in the storage bag and capable of spreading upward from the storage bag.

3. The stroller of claim 1, wherein the expansible side portion is connected to an upper edge portion of the main portion and capable of being folded toward the inside of the main portion to be disposed in the accommodating space.

4. The stroller of claim 1, wherein each side support assembly comprises an upper side bar, a lower side bar, a front leg, and a rear leg, an upper end portion of the front leg is connected to a front end portion of the upper side bar, a middle portion of the front leg is connected to a front end portion of the lower side bar, an upper end portion of the rear leg is connected to the upper side bar, the front seat assembly comprises a front seat plate, a leg rest assembly, and a back rest tube, the front seat plate is connected to and between the two lower side bars, the leg rest assembly is pivotally connected to a front end portion of the front seat plate, the back rest tube is pivotally connected to the lower side bars, the accommodating basket is disposed between the two lower side bars, and the expansible side portion is capable of spreading upward to be fixed on the upper side bars.

5. The stroller of claim 4, wherein each side support assembly further comprises a push bar and a hand bar, a middle portion of the push bar is connected to a rear end portion of the upper side bar, a lower portion of the push bar is connected to a rear end portion of the lower side bar, a lower end portion of the push bar is connected to the rear leg, the accommodating basket further comprises a net bag and a partition plate, the partition plate is partially separably connected to a rear side portion of the main portion outside the main portion, the net bag is connected to the main portion and the partition plate, the net bag is capable of being stored between the partition plate and the rear side portion, and when a portion of a circumference of the partition plate is separated from the rear side portion, the net bag is capable of spreading upward to be fixed on the push bars or the hand bars so as to form an external accommodating space outside the main portion.

6. The stroller of claim 4, wherein the rear seat structure is a rear seat plate located in the rear seat space and above the accommodating basket, the rear seat plate comprises a supporting frame and a liftable seat plate portion, the supporting frame is disposed on and between the two lower side bars, the liftable seat plate portion is pivotally connected to the supporting frame, the liftable seat plate portion is capable of being supported by the supporting frame for child to sit thereon, and when the liftable seat plate portion is lifted toward the back rest tube, the expansible side portion is capable of spreading upward to be fixed on the upper side bars so that the accommodating space extends upward into the rear seat space.

7. The stroller of claim 4, wherein the rear seat structure is a rear seat plate located in the rear seat space and above the accommodating basket, the rear seat plate comprises a first plate member, a second plate member, and a connection member, the first plate member is pivotally connected to and between the two lower side bars, the second plate member is connected to the first plate member by the connection member such that the second plate member and the first plate member are foldable, the second plate member and the first plate member are capable of being supported by the two lower side bars for child to sit thereon, and when the second plate member and the first plate member are lifted and folded toward the back rest tube, the expansible side portion is capable of spreading upward to be fixed on the upper side bars so that the accommodating space extends upward into the rear seat space.

8. The stroller of claim 1, wherein the main portion comprises a rear side portion, two side portions, and two connection portions, two opposite edges of the rear side portion are separably connected to the two side portions respectively, the two connection portions are connected to the two opposite edges of the rear side portion and the two side portions respectively and are foldable, the expansible side portion is connected to the two side portions, the two connection portions, and the rear side portion, and when the two opposite edges of the rear side portion are separated from the two side portions, the two connection portions unfold, and the expansible side portion is capable of spreading upward so that the accommodating space extends upward and expands toward the outside the stroller frame.

9. The stroller of claim 1, wherein the rear seat structure is detachably disposed between the two side support assemblies and located in the rear seat space, and when the rear seat structure is detached from the stroller frame, the expansible side portion is capable of spreading upward to be fixed on the two side support assemblies so that the accommodating space extends upward into the rear seat space.

* * * * *